United States Patent [19]

Muth

[11] Patent Number: 5,511,925
[45] Date of Patent: Apr. 30, 1996

[54] BIN UNLOADING APPARATUS

[76] Inventor: Gordon E. Muth, R.R. #1, Sylvan Lake, Alberta, Canada, TOM 1Z0

[21] Appl. No.: 336,735

[22] Filed: Nov. 7, 1994

Related U.S. Application Data

[63] Continuation-in-part of Ser. No. 164,571, Dec. 10, 1993, abandoned.

[30] Foreign Application Priority Data

Jan. 7, 1993 [CA] Canada .................................. 2086902

[51] Int. Cl.⁶ .................................................. B65G 65/46
[52] U.S. Cl. ........................ 414/310; 414/326; 414/319; 198/550.6; 222/413
[58] Field of Search ..................... 414/304, 310, 414/311, 312, 287, 306, 307, 208, 309, 305, 313, 317, 318, 319, 320, 321, 322, 325, 326, 133; 198/550.1, 550.01, 550.2, 550.5, 550.6; 222/410, 411, 412, 413

[56] References Cited

U.S. PATENT DOCUMENTS

| | | |
|---|---|---|
| 3,536,210 | 10/1970 | Dickinson . |
| 3,647,094 | 3/1972 | Jackson . |
| 4,377,364 | 3/1983 | Weaver . |
| 4,534,693 | 8/1985 | Weaver . |
| 4,806,058 | 2/1989 | Galichowski et al. . |
| 4,824,312 | 4/1989 | Schiltz . |
| 5,167,318 | 12/1992 | Siemens .............................. 198/550.01 |

FOREIGN PATENT DOCUMENTS

| | | |
|---|---|---|
| 840857 | 5/1970 | Canada . |
| 888012 | 12/1971 | Canada . |
| 2355747 | 6/1976 | France . |

*Primary Examiner*—Frank E. Werner
*Attorney, Agent, or Firm*—Adrian D. Battison; Murray E. Thrift

[57] ABSTRACT

A bin unloading apparatus includes a housing attachable to a bin floor. The housing has an interior cavity, a rotatable lower portion with an intake opening, and a stationary upper portion with an output opening. A sweep auger is secured to the rotatable lower portion of the housing. The sweep auger has a first end extending through the intake opening and a second end. The rotatable portion of the housing rotates as the sweep auger moves radially about the housing. A discharge auger trough is secured to the stationary upper portion of the housing. A discharge auger is disposed in the discharge auger trough. The discharge auger has a first end extending through the output opening and a second end. As the sweep auger moves radially around the housing material is moved by the sweep auger through the intake opening into the interior cavity of the housing. A vertical lift auger is disposed in the interior cavity of the housing having a lower end and an upper end. The lower end is connected through a first gear box with the first end of the sweep auger. The upper end is connected through a second gear box with the first end of the discharge auger. A drive device disposed exterior of the bin is secured to the second end of the discharge auger to rotate the discharge auger, the vertical lift auger, and the sweep auger.

10 Claims, 3 Drawing Sheets

BIN UNLOADING APPARATUS

This application is a continuation-in-part of application Ser. No. 08/164,571, filed Dec. 10th, 1993 and now abandoned.

The present invention relates to a bin unloading apparatus having a discharge auger and a sweep auger which moves radially about a bin floor sweeping material toward the discharge auger.

BACKGROUND OF THE INVENTION

There are a variety of bin unloading systems which utilize a centrally positioned well in the bin floor, a discharge auger for moving material from the well, and a sweep auger which moves radially about the bin floor sweeping material into the well. These systems provide an advantage when the level of material in the bin is low, as material is swept into the well and removed by the discharge auger that would otherwise have to be removed with shovels. Examples of these bin unloading systems can be found in Canadian Patents 840,857; 888,012; and U.S. Pat. Nos. 4,377,364; 4,534,693; and 4,806,058.

These bin unloading systems work extremely well. However, they can only be used in bins which have a well in their floor. This makes it difficult to convert existing bins over to this form of bin unloading system. A further example of a bin unloading device which is mounted above the floor is shown in U.S. Pat. No. 4,824,312 (Schiltz) which discloses a substantially horizontal discharge auger arranged at a height above the floor, a vertical lift auger lifting the material from the floor to the horizontal discharge auger and a sweep auger which rotates around a centre axis of the bin and pulls the material from the bin into the centre to the bottom of the vertical lift auger. This arrangement is however disadvantageous in that it does not properly communication the materials from the sweep auger into the discharge auger in a manner which provides efficiency of discharge and protects the material against damage. Furthermore it is intended that significant parts of the device are removed from each bin and transferred to a next bin. While on the face of it provides an economic arrangement, the disadvantages of having to extract the parts of the device render it less efficient.

U.S. Pat. No. 3,536,210 (Dickinson) discloses an arrangement of the underfloor type in which the sweep auger is driven by a gear box at a centre of the bin with that gear box being driven by a longitudinal shaft extending along the hollow interior of the discharge auger drive shaft. The interior shaft and the hollow shaft can be disconnected so as to drive only the discharge auger or the drive shaft can be connected to the hollow shaft to drive both the sweep auger and the discharge auger. However again this arrangement is of the underfloor type which is disadvantageous in that it requires excavation of the floor.

U.S. Pat. No. 3,647,094 (Jackson) discloses a sweep auger with a shroud having a closed front face with a number of flaps which can be opened one at a time along the length of the sweep auger.

French Patent 2,355,747 discloses an above floor arrangement of the type including a vertical lift auger, sweep auger and a discharge auger similar to that of Schiltz. The interconnection between the vertical lift auger tube and the discharge auger tube is formed simply by welding or attaching the horizontal tube of the discharge auger into one side face of the vertical tube of the lift auger. This arrangement does not allow the ability to maximize the efficiency of transfer and to ensure reduced damage of the material to be transported.

SUMMARY OF THE INVENTION

It is one object of the present invention to provide a bin unloading apparatus having a discharge auger and a sweep auger which moves radially about a bin floor sweeping material toward the discharge auger, that does not require a well in the bin floor and yet provides efficient and non-damaging transfer of the material from the sweep auger via the vertical lift auger to the discharge auger.

According to the present invention there is provided a bin unloading apparatus having a discharge auger and a sweep auger which moves radially about a bin floor sweeping material toward the discharge auger. The bin unloading apparatus includes a housing attachable to a bin floor. The housing has a top, an interior cavity, a rotatable lower portion with an intake opening, and a stationary upper portion with an output opening. A sweep auger is secured to the rotatable lower portion of the housing. The sweep auger has a first end extending through the intake opening and a second end. The rotatable portion of the housing rotates as the sweep auger moves radially about the housing. A discharge auger trough is secured to the stationary upper portion of the housing. A discharge auger is disposed in the auger trough. The discharge auger has a first end extending through the output opening and a second end. A shroud covers the sweep auger. The shroud has an elongate intake aperture facing the direction of travel of the sweep auger. As the sweep auger moves radially around the housing material passes through the elongate intake aperture and is moved by the sweep auger along a passage defined by the shroud through the intake opening into the interior cavity of the housing. A vertical lift auger is disposed in the interior cavity of the housing having a lower end and an upper end. The lower end is connected through a fist gear box with the first end of the sweep auger. The upper end is connected through a second gear box with the first end of the discharge auger. A single drive means disposed exterior of the bin is secured to the second end of the discharge auger. The single drive means rotates the discharge auger, the vertical lift auger, and the sweep auger.

Although beneficial results may be obtained through the use of the bin unloading apparatus, as described, the vertical lift auger of like diameter is not able to handle the same flow rate as either the sweep auger of the discharge auger. In order to improve flow rates and avoid the risk of blockages it is preferred that modifications be made to the vertical lift auger. Even more beneficial results may, therefore, be obtained when the vertical lift is of a larger diameter than the sweep auger, and clearance space is provided where the second gear box connects the vertical lift auger with the first end of the discharge auger. It has been found that with the described modifications the vertical lift auger can handle the flow rate generated by the sweep auger.

Although beneficial results may be obtained through the use of the bin unloading apparatus, as described, the bin unloading apparatus must be able to handle a flow from above the housing when the bin is substantially full. Even more beneficial results may, therefore, be obtained by placing a closure on the top of the housing which is movable between a closed position and an open position. When the closure is in the pen position material falls from above onto the first end of the discharge auger. The closure can be moved between the closed and open positions from exterior of the bin through the use of an activation rod.

Although beneficial results may be obtained through the use of the bin unloading apparatus, as described, it is important that measures be taken to ensure that the augers are not overloaded to the point where there is a danger of blockages occurring. Should blockages occur they are extremely difficult to remedy in view of the volume of material stored within the bin. Even more beneficial results may, therefore be obtained by using a discharge auger trough which is cylindrical with a top surface having at least one closure and preferably a plurality of closures. The closures are movable between a closed position and an open position. When the closures are in the open position material falls from above onto the discharge auger. With this form of mechanism material enters the discharge auger trough only at selected locations, and the closures can be opened either fully or partially depending upon the flow characteristics of the material in the bin. Even more beneficial results may, also, be obtained by having a movable flow regulator member that restricts the size of the elongate intake aperture on the shroud. The use of the flow restrictor enables the volume of material entering the sweep auger to be similarly controlled.

Although beneficial results may be obtained through the use of the bin unloading apparatus, as described when the bin is full of material there is no need for the sweep auger to be activated. Even more beneficial results may, therefore, be obtained when the discharge auger is hollow with a secondary shaft extending therethrough. The secondary shaft has a first end connected to the second gear box and a second end extending to adjacent the second end of the discharge auger. Coupling means are provided for non-rotatably coupling the secondary shaft with the discharge auger. When the secondary shaft is non-rotatably coupled with the discharge auger the vertical lift auger, and the sweep auger rotate with the discharge auger. When the coupling means are disengaged the discharge auger rotates, while the vertical lift auger and the sweep auger remain stationary.

One embodiment of the invention will now be described in conjunction with the accompanying drawings in which:

DETAILED DESCRIPTION

Figure 1A:
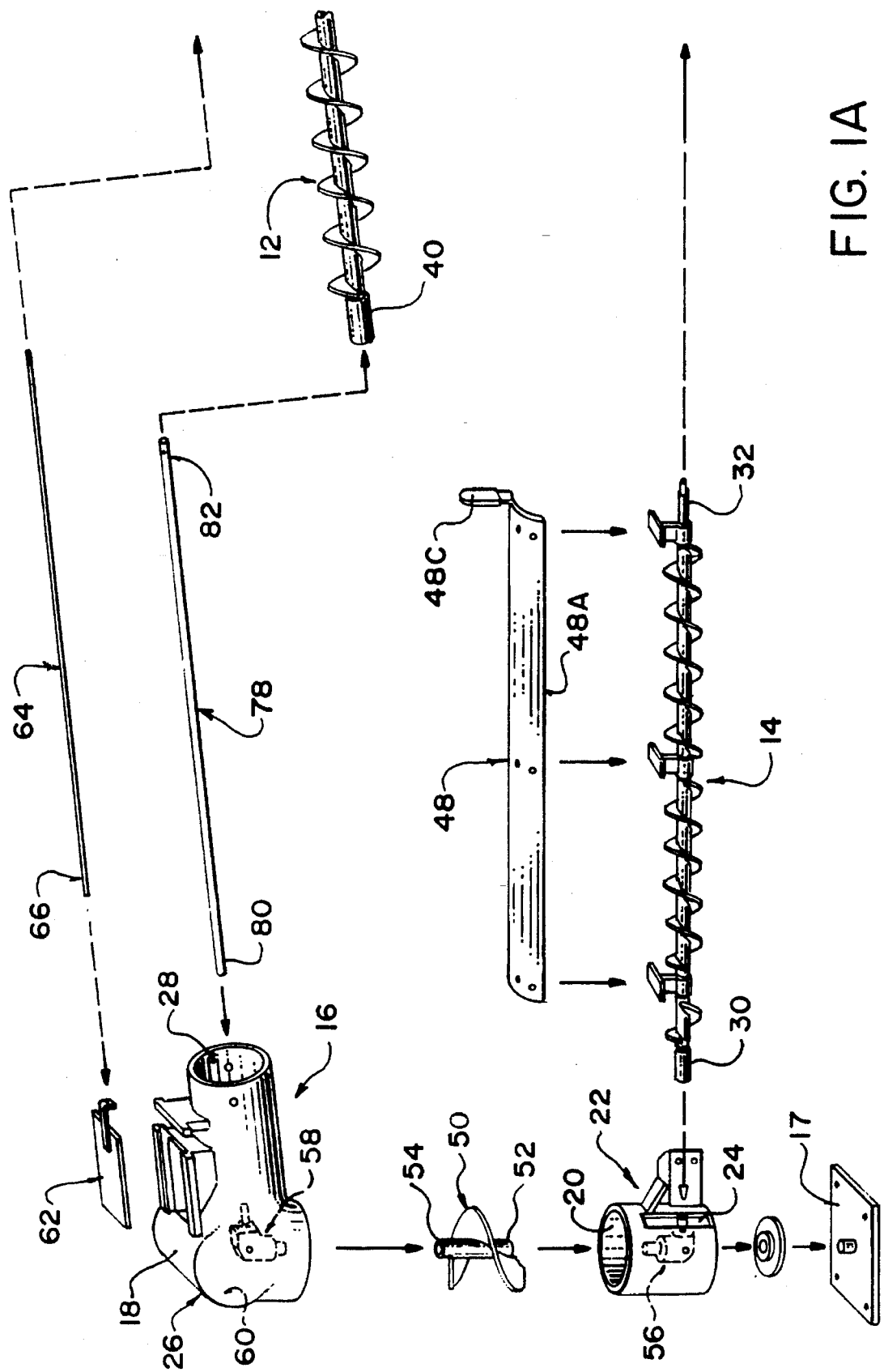
FIG. 1A and 1B are left and right exploded side elevation views, respectively, of a bin unloading apparatus constructed in accordance with teachings of the present invention.

Bin unloading apparatus 10 is of the type that has a discharge auger 12 and a sweep auger 14 which moves radially about a bin floor sweeping material toward discharge auger 12. This particular embodiment is characterized by a housing 16 attachable to the bin floor by means of a anchoring base plate 17. Housing 16 includes a top 18, an interior cavity 20, a rotatable lower portion 22 with an intake opening 24, a stationary upper portion 26 with an output opening 28. Sweep auger 14 is secured to a rotatable lower portion 22 of housing 16. Sweep Auger 14 has a first end 30 extending through intake opening 24 and a second end 32. Second end 32 is supported by a wheel 33. The rotatable lower portion 22 of housing 16 rotates as sweep auger 14 moves radially about housing 16. A cylindrical discharge auger trough 34 is secured to stationary upper portion 26 of housing 16. Discharge auger trough 34 has a top surface 36. Discharge auger 12 is constructed of hollow tubular material and has an axially extending bore 38, a first end 40 extending through output opening 28 and a second 3nd 42. Discharge auger 12 is disposed within auger trough 34. A shroud 44 covers sweep auger 14. Shroud 44 has an elongate intake aperture 46 facing the direction of travel of sweep auger 14. Shroud 44 has a movable flow regulate member 48 that restricts the size of elongate intake aperture 46. A vertical lift auger 50 is disposed within interior cavity 20 of housing 16. Vertical lift auger 50 has a lower end 52 and an upper end 54. Lower end 52 is connected through a first gear box 56 with first end 30 of sweep auger 14. Upper end 54 is connected through a second gear box 58 with first end 40 of discharge auger 12. It is preferred that vertical lift auger 50 be of a larger diameter than sweep auger 14. A clearance space 60 is provided where second gear box 58 connects upper end 54 of vertical lift auger 50 with the first end 40 of discharge auger 12. A closure 62 is provided on top 18 of housing 16. Closure 62 is movable between a closed position and an open position. An activation rod 64 is provided having a first end 66 secured to closure 62 and a second end 68 disposed exterior of the bin. Activation rod 64 is used to move closure between the closed and open positions by manipulating second end 68 of activation rod 64 from exterior of the bin. A pair of secondary closures 70 are provided on top surface 38 of discharge auger trough 34. Secondary closures 70 are movable between a closed position and an open position. A secondary activation rod 72 is provided having a first end 74 and a second end 76. First end 74 is secured to one of secondary closures 74. The other of secondary closures 70 is attached to a mid point on secondary activation rod 72. Second end 76 is disposed exterior of the bin. Secondary activation rod 72 is used to move secondary closures 70 between the closed and open positions by manipulating second end 76 of secondary activation rod 72 from exterior of the bin. Activation rod 64 and secondary activation rod 72 extend through rod guides 73 on top surface 36 of discharge auger trough 34. A drive motor (not shown) is positioned exterior of the bin and secured to second end 42 of discharge auger 12. A secondary shaft 78 extends through bore 38 of discharge auger 12. Secondary shaft 78 has a first end 80 connected to second gear box 58 and a second end 82 extending to adjacent second end 42 of discharge auger 12. A transverse coupling pin 84 serves as means for non-rotatably coupling secondary shaft 78 with discharge auger 12. Also illustrated in FIG. 1 but not numbered or further described are bolts, nuts, washers, bushings, and attachment brackets necessarily incidental to the assembly of the described components.

The use and operation of bin unloading apparatus will now be described with reference to FIG. 1. We will start with the assumption that the bin is full of material. Upon activation of the drive motor positioned at second end 42 of discharge auger 12 discharge auger 12 rotates. By pulling on second end 68 of activation rod 64, closure 62 is movable from its initial closed position to a partially open or fully open position. In the open position material falls from above onto first end 40 of discharge auger 12 and is carried from the bin. Should it be desirable to increase the volume of material being carried by discharge auger 12, second end 76 of secondary activation rod 72 may also be pulled to move secondary closures 70 from their initial closed position to a partially open or fully open position. As the bin empties there will no longer be a flow from above through closure 62 and secondary closures 70. When this occurs closure 62 is moved to a closed position by manipulating second end 68 of activation rod 64, and secondary closures 70 are moved to closed positions by manipulating second end 76 of secondary activation rod 72. As long as transverse coupling pin 84 was removed discharge auger 12 rotated while vertical lift auger 50 and sweep auger 14 remained stationary. When the volume of material flowing from discharge auger 12 diminished to an extent where it is desirable to activate sweep auger 14, the drive motor is stopped to permit insertion of transverse coupling pin 84. When transverse coupling pin 84 is in position secondary shaft 78 is non-rotatably coupled with discharge auger 12. Upon reactivation of the drive motor positioned at send end 42 of discharge auger 12 discharge auger 12 rotates, as before. However, due to the coupling with secondary shaft 78, vertical lift auger 50, and sweep auger 14 rotate with discharge auger 12. As sweep auger 14 moves radially material passes through elongate intake aperture 46 and is moved by sweep auger 14 along a passage defined by shroud 44 through intake opening 24 and into interior cavity 20 of housing 16. The position of flow regulator member 48 is preset so restrict the size of elongate intake aperture 46 so sweep auger 14 will not become clogged as a result of having been buried by large volume of material. Vertical lift auger 50 would not normally be able to handle the same volume as sweep auger 14. In order to address this problem vertical lift auger 50 is of a larger diameter than sweep auger 24 and a clearance space 60 is provided where second gear box 58 connects upper end 54 of vertical lift auger 50 with first end 40 of discharge auger 12. The effect of these changes is to have material thrown passed clearance space 60 onto first end 40 of discharge auger 12. It has been found that with these modifications vertical lift auger 50 can carry the volume of material being moved by sweep auger 14. It is, however, preferred that the height of vertical lift auger 50 be kept to a minimum. When clearance space 60 is used in conjunction with a short vertical lift auger there is very little vertical lift required before the material is into clearance space 60 and rounding the corner. Prior to modifying housing 16 to include clearance space 60 a 90° bend was tried. It was found that material was crushed into the corner of the bend. Clearance space 60 helps prevent material from being crushed as it turns the corner from vertical travel to horizontal travel. It is preferred that the angle between vertical lift auger 50 and discharge auger 12 be between 96° and 100° as this range of bend further helps reduce the crushing of material. This crushing of material can be of importance for crops such as; wheat, barley, canola, corn and peas.

The shank adapter of the present invention therefore can be used in conjunction with the deep banding point 70, in conjunction with the deep banding point 70 used with the wings 80 or can be used alternately with the sweep 90 or as a yet further alternative with the modified point of FIGS. 6, 7 and 8. The shank adapter therefore provides a number of alternative uses all of which effectively mount and control the position of the ground working tool on the end of the shank 60. The position of the material delivery duct welded to the rear surface of the second portion holds that delivery duct at a required position and allows it to properly dispense the fertilizer, seed, mixture of fertilizer and seed or to deliver liquid materials such as liquid fertilizer and anhydrous ammonia to the soil at the required position behind the banding point or behind the sweep.

Figure 2:
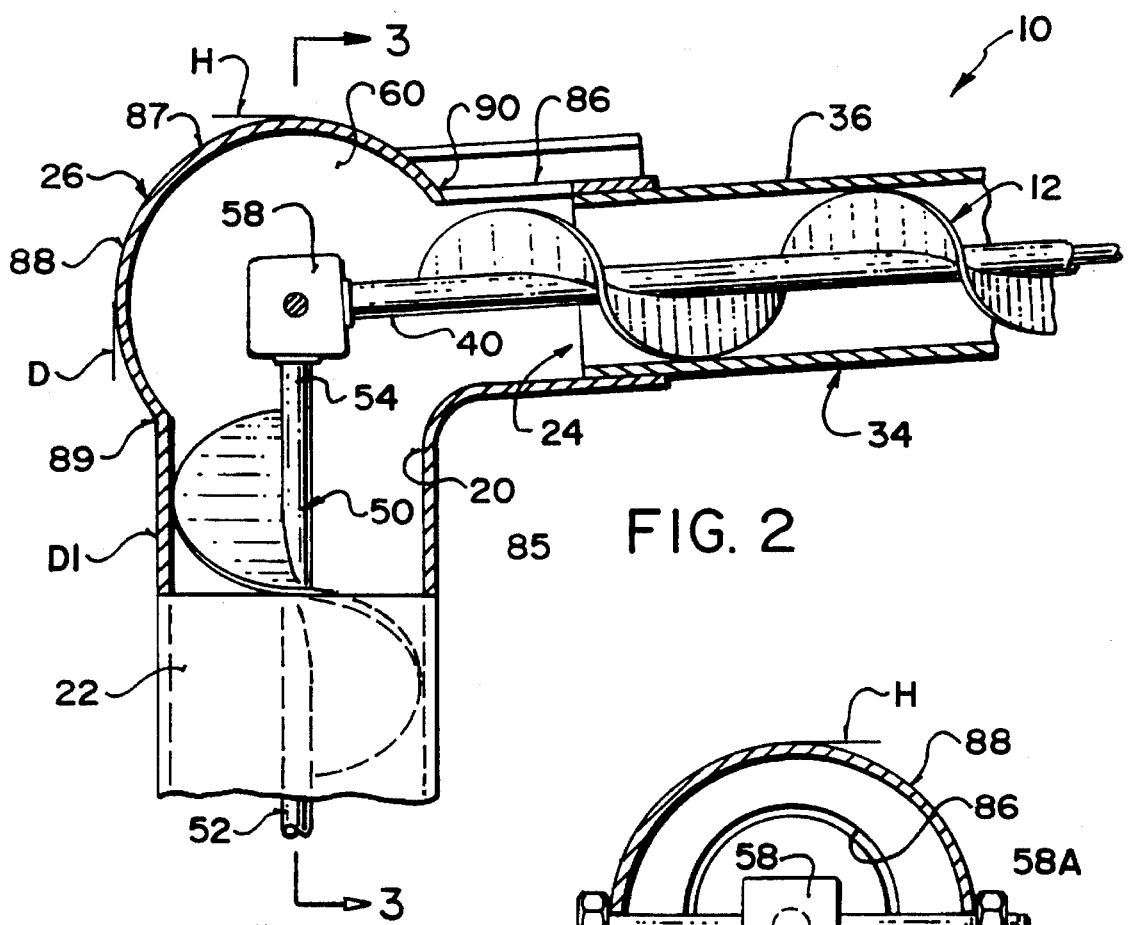
FIG. 2 is a vertical cross section through the junction between the discharge auger and the vertical lift auger, the cross section being taken in a plane containing the axes of those augers.
Figure 3:
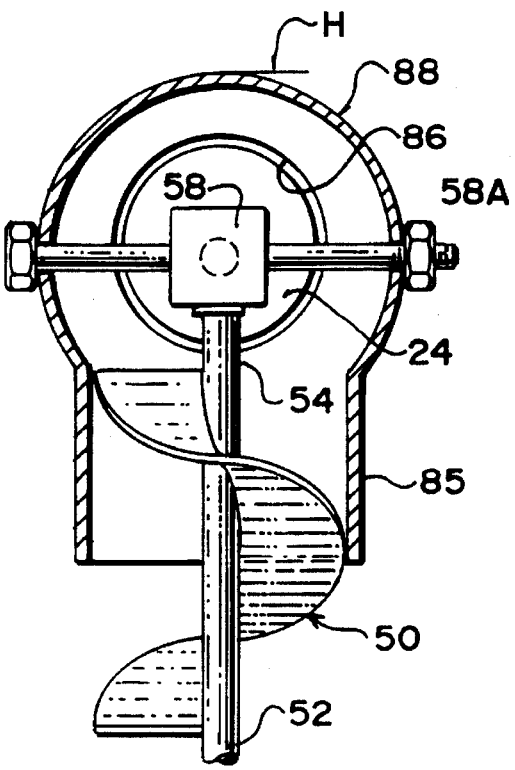
FIG. 3 is a cross sectional view along the lines 3—3 of FIG. 2.

Turning now to FIGS. 2 and 3, further detail of the housing 10 is shown and including particularly the construction of the upper housing portion which is fixed at the top of the vertical lift auger and remains stationary with the discharge auger. Thus in FIG. 2, the upper housing portion is shown in a vertical cross section containing the axes of the vertical lift auger 50 and the discharge auger 12.

Thus the upper housing portion includes a first cylindrical part 85 closely surrounding the imaginary cylinder containing the periphery of the flight of the vertical lift auger 50. The upper housing portion further includes a second cylindrical part 86 closely surrounding the imaginary cylinder containing the outside periphery of the flight of the discharge auger 12. In between the first and second parts is provided a third part generally indicated at 87 which defines the clearance space 60 previously described. The third part 87 defines a surface 88 shown in FIG. 2 which commences at an end 89 at the top of the first cylindrical part 85 and extends therefrom in a generally circular path to an end 90 interconnecting with the second part 86. The surface 88 is thus contiguous and smoothly curved and defines a clearance space which is of greater volume than the imaginary interconnection between extensions of the parts 85 and 86. The surface 88 extends to height H which is greater than the top of the part 86. The surface 88 further extends to a distance D from the axes of the lift auger 50 which is greater than the distance D1 of the part 85 from the same axis. These dimensions D and H thus define the clearance space 60.

Figure 1B:
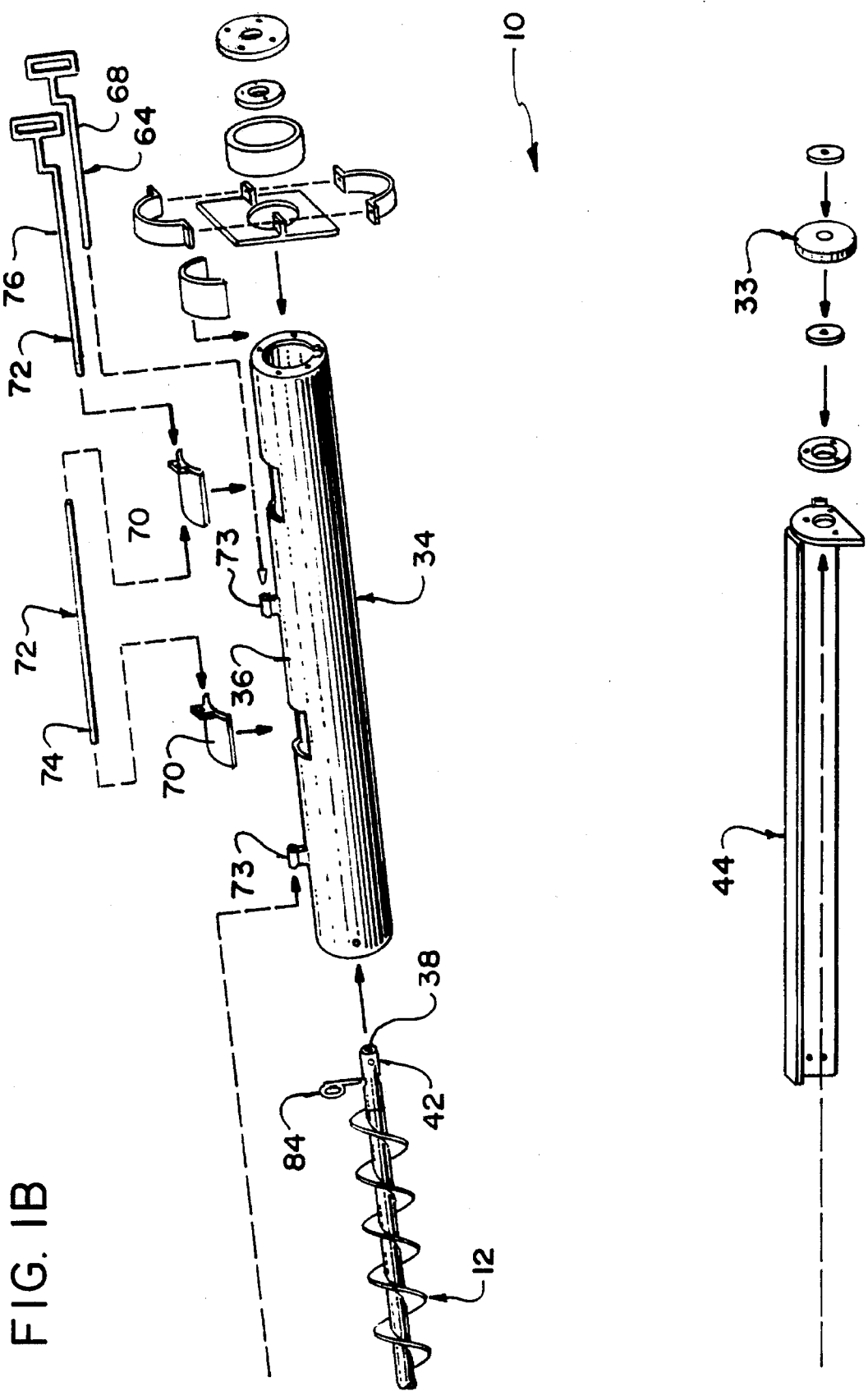

In the embodiment shown in FIG. 1, the surface 88 is formed as a part cylindrical surface. In the embodiment shown in FIG. 3, the surface 88 is part spherical so that it is defined by the curvature as shown in FIG. 2 together with the side to side curvature shown in FIG. 3. It will be noted also that the gear box 58 is mounted on a transverse rod 58A extending across the upper housing portion and connected to the sides of the spherical or bulbous surface 88.

The smooth curvature of the surface 88 particularly in planes parallel to the plane of FIG. 2 causes the material lifted by the lift auger to be smoothly transported around the surface 88 into the discharge auger without the possibility of trapping within sharp corners and without the possibility of being compressed. Thus the clearance space 60 defined by the bulbous surface 88 accommodates the gear box 58 and yet provides a volume which is sufficient to receive all the material lifted by the lift auger to prevent compression of that material and thus damage to delicate crops such as peas.

Figure 4:
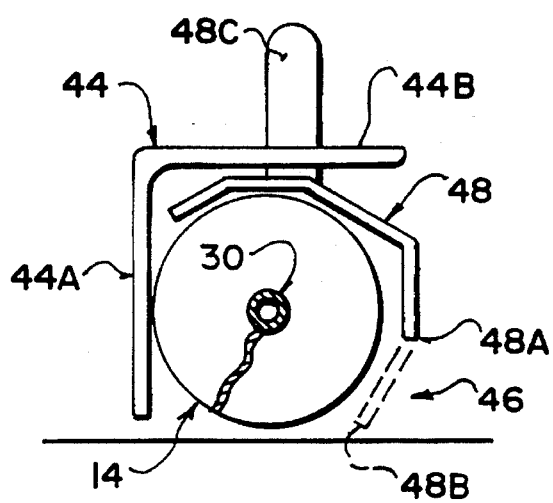
FIG. 4 is a vertical cross sectional view through the sweep auger of FIG. 1.

Turning now to FIG. 4, the shroud 44 is shown in more detail as including a vertical back wall 44A and a horizontal top wall 44B. The shield 48 is mounted for pivotal movement about the axis of the auger flight 30 so that a lowermost edge 48A of the shield can move from a fully raised position (not shown) to a partly closed position shown in full line and finally to a fully closed position shown in dotted line and indicated at 48B. The pivotal movement is effected by a lever 48C located at the outer end of the sweep auger. In this way the shield can be moved to the fully closed position prior to filling of the bin so that when the bin is fully filled and the sweep auger covered by the material, the sweep auger is closed off to prevent the entry of material into the sweep auger. When the bin is emptied to the top of the discharge auger, the sweep auger can then be started by insertion of the pin 84 and it is not inhibited from starting by the compression of material within the sweep auger. When the sweep auger is started, the shield is raised to a predetermined position so that a lowermost edge 48A is positioned from the ground by a distance to allow in feed of sufficient material to efficiently control the supply of material through the system to the discharge auger and from the discharge auger into the loading system. Thus the operator can control the amount of feed input into the sweep auger by adjusting the shield and this amount can be controlled in accordance with demand at a downstream position in the discharge line.

Since various modifications can be made in my invention as herein above described, and many apparently widely different embodiments of same made within the spirit and scope of the claims without departing from such spirit and scope, it is intended that all matter contained in the accompanying specification shall interpreted as illustrative only and not in a limiting sense.

I claim:

1. A bin unloading apparatus comprising:

a bin having a bin floor and a peripheral bin wall;

a housing attached to the bin floor, the housing defining an interior cavity and having a lower portion rotatable about a vertical axis of the housing with an intake opening and a stationary upper portion with an output opening;

a sweep auger secured to the rotatable lower portion of the housing, the sweep auger having a sweep auger flight with a first end extending through the intake opening and a second end, the rotatable portion rotating as the sweep auger rotates about the axis;

a shroud covering the sweep auger flight, the shroud having an elongate intake aperture facing a direction of travel of the sweep auger, such that as the sweep auger moves radially material passes through the elongate intake aperture and is moved by the sweep auger along a passage defined by the shroud through the intake opening into the interior cavity of the housing;

a discharge auger having a hollow tubular discharge auger tube connected to the housing and a discharge auger flight, the discharge auger having a first end extending through the output opening and a second end;

a vertical lift auger flight disposed in the interior cavity of the housing having a lower end and an upper end, the lower end being connected through a first gear box with the first end of the sweep auger flight;

a closure on the top of the upper portion of the housing movable between a closed position and an open position such that when the closure is in the open position material falls from above onto the first end of the discharge auger flight;

an activation rod having a first end secured to the closure and a second end disposed outside of the bin whereby the closure is movable between the closed and open positions from outside of the bin;

drive means disposed exteriorly of the bin for driving the second end of the discharge auger flight and the upper end of the vertical lift auger;

the upper portion of the housing including a first cylindrical part closely coaxially surrounding the vertical lift auger flight, a second cylindrical part closely coaxially surrounding the discharge auger flight and a third part intermediate the first and second parts which, in a vertical cross-section containing the axes of the vertical lift auger and the discharge auger, defines a surface interconnecting the first and second parts which is smoothly curved and extends to a height above the second cylindrical part.

2. The bin unloading apparatus as defined in claim 1 wherein the surface defines substantially an arc of a circle.

3. The bin unloading apparatus as defined in claim 1 wherein the surface extends to a position spaced outwardly from the discharge auger tube to a distance greater than that of the second cylindrical part.

4. The bin unloading apparatus as defined in claim 1 wherein the third part defines substantially a part of a sphere.

5. The bin unloading apparatus as defined in claim 1 wherein the third part is arranged so as to define a substantially smooth transition between each part of the periphery of the first part and the second part.

6. The bin unloading apparatus as defined in claim 1 wherein the vertical lift auger flight is of a larger diameter than the sweep auger flight.

7. The bin unloading apparatus as defined in claim 1 wherein the intake aperture of the shroud is substantially continuous along the length of the sweep auger flight and wherein there is provided a movable flow regulator member that restricts the size of the elongate intake aperture on the shroud, the member comprising an elongate flap member extending substantially along the full length of the sweep auger flight with the flap member being movable in a direction transverse to the length to increase and decrease a distance of a bottom edge of the flap member from the bin floor.

8. The bin unloading apparatus as defined in claim 1 wherein the discharge auger flight has a hollow drive tube and a secondary shaft extends through the hollow drive tube, the secondary shaft having a first end connected to a second gear box at an upper end of the vertical lift auger flight and a second end extending to adjacent the second end of the discharge auger, and wherein there is provided a transverse coupling pin for non-rotatably coupling the secondary shaft with the hollow drive tube of the discharge auger flight, such that, when the secondary shaft is non-rotatably coupled with the hollow drive tube of the discharge auger flight, the vertical lift auger flight and the sweep auger flight rotate with the discharge auger flight and, when the coupling pin is removed, the discharge auger flight rotates while the vertical lift auger flight and the sweep auger flight remain stationary.

9. A bin unloading apparatus comprising:

a bin having a bin floor and a peripheral bin wall;

a housing attached to the bin floor, the housing defining an interior cavity and having a lower portion rotatable about a vertical axis of the housing with an intake opening and a stationary upper portion with an output opening;

a sweep auger secured to the rotatable lower portion of the housing, the sweep auger having a sweep auger flight with a first end extending through the intake opening and a second end, the rotatable portion rotating as the sweep auger rotates about the axis;

a shroud covering the sweep auger flight, the shroud having an elongate intake aperture facing a direction of travel of the sweep auger, such that as the sweep auger moves radially material passes through the elongate intake aperture and is moved by the sweep auger along a passage defined by the shroud through the intake opening into the interior cavity of the housing;

a discharge auger having a hollow tubular discharge auger tube connected to the housing and a discharge auger flight, the discharge auger having a first end extending through the output opening and a second end;

a vertical lift auger flight disposed in the interior cavity of the housing having a lower end and an upper end, the lower end being connected through a first gear box with the first end of the sweep auger flight;

a closure on the top of the upper portion of the housing movable between a closed position and an open position such that when the closure is in the open position material falls from above onto the first end of the discharge auger flight;

an activation rod having a first end secured to the closure and a second end disposed outside of the bin whereby the closure is movable between the closed and open positions from outside of the bin;

drive means disposed exteriorly of the bin for driving the second end of the discharge auger flight and the upper end of the vertical lift auger;

wherein the intake aperture of the shroud is substantially continuous along the length of the sweep auger flight and wherein there is provided a movable flow regulator member that restricts the size of the elongate intake aperture on the shroud, the member comprising an elongate flap member extending substantially along the full length of the sweep auger flight with the flap member being movable in a direction transverse to the length to increase and decrease a distance of a bottom edge of the flap member from the bin floor.

10. The apparatus according to claim 9 wherein the flap member is movable to a position to substantially close the intake aperture.

* * * * *